United States Patent [19]
Grabowski

[11] Patent Number: 5,724,742
[45] Date of Patent: Mar. 10, 1998

[54] RECIPROCATING SAW BLADE CLAMP

[75] Inventor: Benjamin J. Grabowski, Joppa, Md.

[73] Assignee: Black & Decker Inc., Newark, Del.

[21] Appl. No.: 687,850

[22] Filed: Jul. 26, 1996

Related U.S. Application Data

[60] Provisional application No. 60/001,591, Jul. 27, 1995.

[51] Int. Cl.$^6$ .................................................. B27B 19/02
[52] U.S. Cl. ............................ 30/392; 30/394; 30/337
[58] Field of Search .................. 83/699.21; 279/83, 279/140; 403/362, 374, 373, 358, 356, 355; 30/392, 393, 394, 337, 338, 335, 330

[56] References Cited

U.S. PATENT DOCUMENTS

| | | | |
|---|---|---|---|
| 1,542,127 | 6/1925 | Hastings | 83/530 |
| 1,659,801 | 2/1928 | Basmaison | 30/330 |
| 1,984,500 | 12/1934 | Tautz | 279/83 |
| 2,722,244 | 11/1955 | Schultz . | |
| 2,966,178 | 12/1960 | Katzfey . | |
| 3,262,205 | 7/1966 | Arden | 30/338 |
| 3,542,097 | 11/1970 | Dudek et al. . | |
| 3,738,003 | 6/1973 | Dietzen et al. | 279/83 |
| 3,781,025 | 12/1973 | D'Angelo | 30/392 |
| 3,845,554 | 11/1974 | Joanis et al. | 30/330 |
| 3,927,893 | 12/1975 | Dillon et al. . | |
| 4,601,447 | 7/1986 | Barrett et al. | 30/394 |
| 4,601,477 | 7/1986 | Barnett et al. . | |
| 4,656,742 | 4/1987 | Wagner . | |
| 4,739,557 | 4/1988 | Wagner . | |
| 4,962,588 | 10/1990 | Fushiya et al. . | |
| 5,083,376 | 1/1992 | Lentino | 30/392 |
| 5,165,173 | 11/1992 | Miller . | |
| 5,170,564 | 12/1992 | Kaiser . | |
| 5,322,302 | 6/1994 | Quirijnen . | |
| 5,351,590 | 10/1994 | Everts et al. . | |
| 5,363,733 | 11/1994 | Baird et al. . | |

FOREIGN PATENT DOCUMENTS

| | | | |
|---|---|---|---|
| 0623413 | 11/1994 | European Pat. Off. . | |
| 2505637 | 8/1976 | Germany | 403/362 |
| 9400440 | 4/1994 | Germany . | |
| 7408084 | 10/1994 | Germany . | |
| 2069406 | 8/1981 | United Kingdom . | |
| 2192363 | 1/1988 | United Kingdom . | |
| 93/05915 | 4/1993 | WIPO . | |

*Primary Examiner*—Maurina T. Rachuba
*Attorney, Agent, or Firm*—Dennis A. Dearing; John D. Del Ponti; Charles E. Yocum

[57] ABSTRACT

A reciprocating saw 10 includes a motor 17, a gear train 19, a drive shaft 15 and a blade clamp 13 for clamping a blade 11 in the saw. Clamp 13 includes sleeve 23 with first and second axially spaced and generally opposed projections 37, 39 for clamping an assembly 21 of blade 11 and drive shaft 15. A bias member 55 for clamping and unclamping blade 11 in sleeve 23 is adjustably attached to a top sidewall 33 of sleeve 23 and engages one side of assembly 21 at a location inwardly of first and second projections 37, 39. Bias member 55 forms a moment arm with a portion of sleeve 23 extending between the location of bias member 55 and first projection 37. Projection 37 serves as the fulcrum for the moment arm. The formation of a moment arm increases the effectiveness of the clamping action and more securely retains the blade 11 in the clamp 13.

11 Claims, 4 Drawing Sheets

RECIPROCATING SAW BLADE CLAMP

CROSS-REFERENCE TO RELATED APPLICATION

This application is based on a provisional patent application which has been assigned U.S. Ser. No. 60/001,591, filed on Jul. 27, 1995.

BACKGROUND OF THE INVENTION

The invention relates to reciprocating saws and more particularly to a clamp for clamping a blade to the drive shaft of the saw.

Reciprocating saws as used herein means any saw having a reciprocal or orbital cutting action such as a jig saw typically used for fine cutting and reciprocating saw used by, carpenters, electricians and plumbers for rough cutting. These saws have a reciprocally or orbitally driven drive shaft for driving a generally linear blade along a rectilinear or orbital drive path for cutting. The blade is clamped to the drive shaft using a variety of clamps. In use, such saws are subject to high vibration forces and binding of the blade in the workpiece. This can cause the clamp to loosen and sometimes permit the blade to fall out of the clamp.

Conventionally, the blade is attached to the drive shaft of the saw by a blade clamp having a slot for receiving the saw blade and a set screw which is received in a hole in the blade. The blade is clamped in place relative to the drive shaft by tightening the screw. Also "keyless" clamps that do not require a tool or key to insert and remove a blade from the clamp are known. But keyless clamps have not been generally successful, because of insufficient clamping force.

Accordingly, it would be desirable to develop a keyed or keyless clamp with greater clamping force to more securely retain the blade in the clamp.

SUMMARY OF THE INVENTION

According to one aspect, the present invention is directed to a reciprocating saw comprising a motor, a gear train, an output drive shaft, and a saw blade clamp for clamping a layered assembly of a saw blade and the drive shaft. The clamp comprises a sleeve fixed to the drive shaft. The sleeve has an axial cavity extending between a front opening for receiving a shank of the saw blade and a rear opening for receiving the drive shaft. A first clamping projection on a top sidewall of the sleeve adjacent the front opening of the sleeve engages one side of the assembly. A second clamping projection on the bottom sidewall inwardly of the front opening and the first projection engages a second opposite side of the assembly. A bias member is adjustably attached to the top sidewall at a location inwardly of the first and second projections and engages the one side of the assembly. The bias member forces the assembly into tight engagement between the clamping projections.

The drive shaft may further have an axially extending central web and a pair of cross bars extending axially of the web. The web and cross bars define a first channel on a first side of web for receiving the first projection and a second channel on a second opposite side of the web for receiving the shank of the blade.

The bias member is preferably a manually adjustable fastener such as a screw.

According to a second aspect, the present invention is directed to a blade clamp for a layered assembly of a blade and a drive shaft of a saw. The clamp comprises a clamp body fixed to the drive shaft. The body has an axial cavity extending between a front opening for receiving a shank of the saw blade and a rear opening for receiving the drive shaft. A first clamping projection on a top sidewall of the sleeve adjacent the front opening of the sleeve engages one side of the assembly. A second clamping projection on a bottom sidewall inwardly of the front opening engages a second opposite side of the assembly. A bias member forms a moment arm between the first projection and a location on the body inwardly of the first and second projections and causes the assembly to be gripped between the first and second projections.

A significant feature of the clamp is that the bias member forms a portion of the body into a moment arm with the first projection serving as a fulcrum for the moment arm. Thus a tight clamping action can be achieved with the application of less force applied to the bias member and in turn to the blade and drive shaft assembly compared to conventional clamps.

BRIEF DESCRIPTION OF THE DRAWINGS

The accompanying drawings which are incorporated in, and constitute a part of, this specification illustrate an embodiment of the invention and together with the description serve to explain the principles of the invention. In the drawings, the same reference numerals indicate the same parts.

DESCRIPTION OF THE PREFERRED EMBODIMENT

Figure 1:
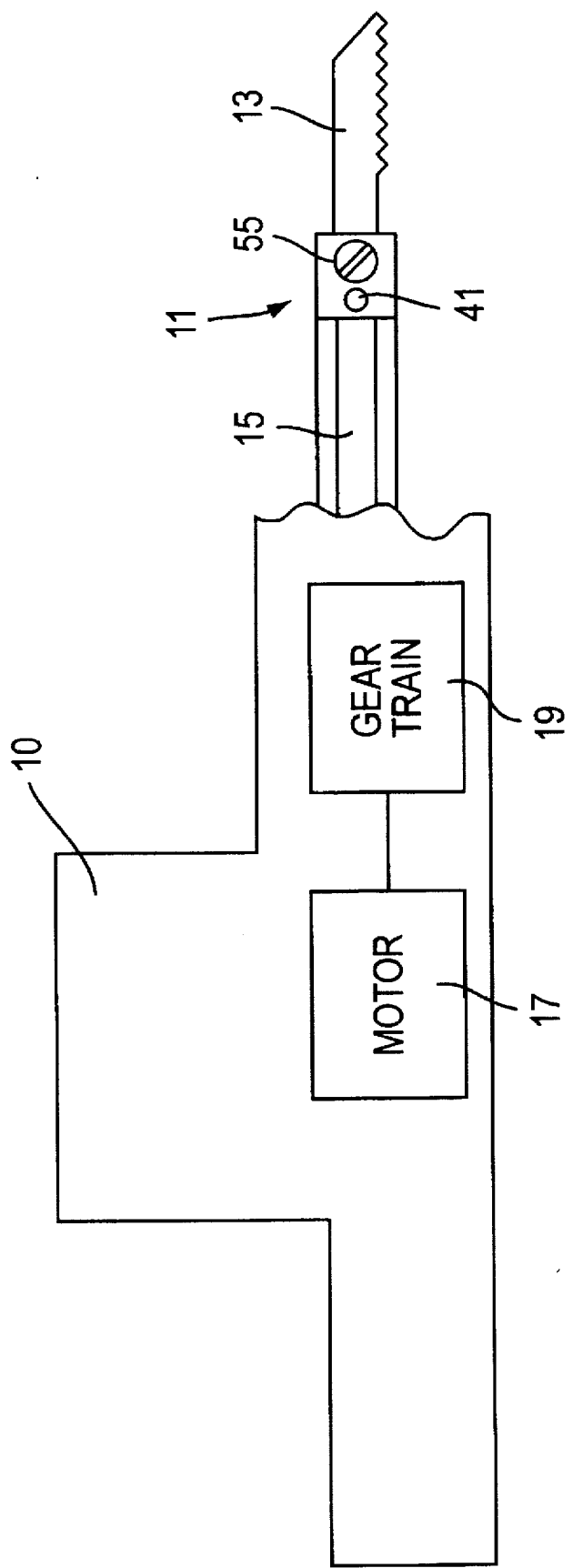
FIG. 1 is a schematic view of a reciprocating saw incorporating a blade clamp in accordance with a preferred embodiment of the present invention.

As shown in FIG. 1, a preferred embodiment of the present invention is directed to a reciprocating saw 10 with a blade clamp 11 for clamping a blade 13 to an I-beam drive shaft 15. Drive shaft 15 is preferably driven by a motor 17 and a gear train 19 for convening the rotary drive output into a linear reciprocating drive for drive shaft 15.

Saw 10 is preferably a reciprocating saw as depicted in schematic form in FIG. 1 but could be a jig saw or a manual saw such as a hack saw.

Figure 2:
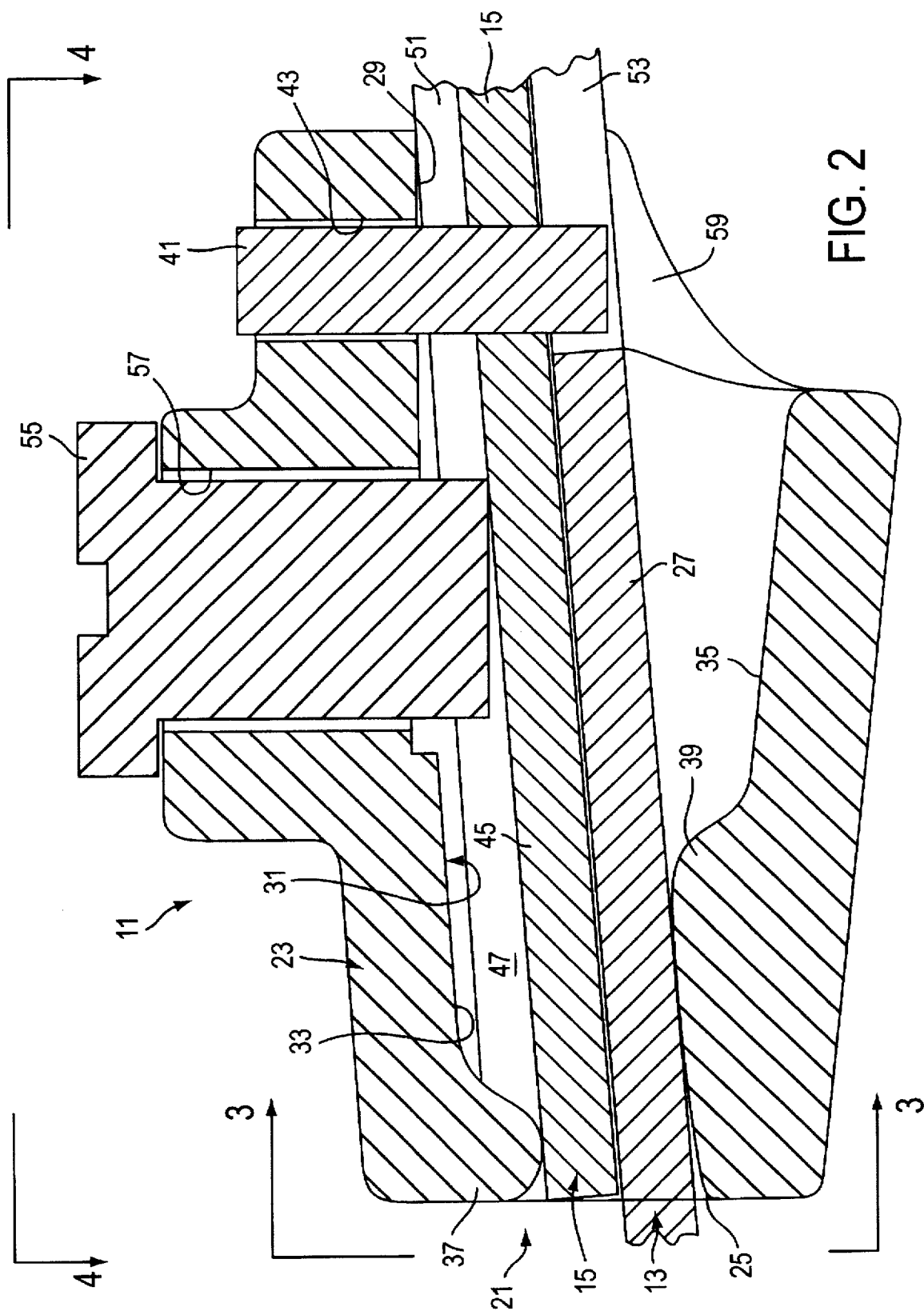
FIG. 2 is a cross-sectional view of the blade clamp (shown in FIG. 1) taken along line 2—2 of FIG. 3.
Figure 3:
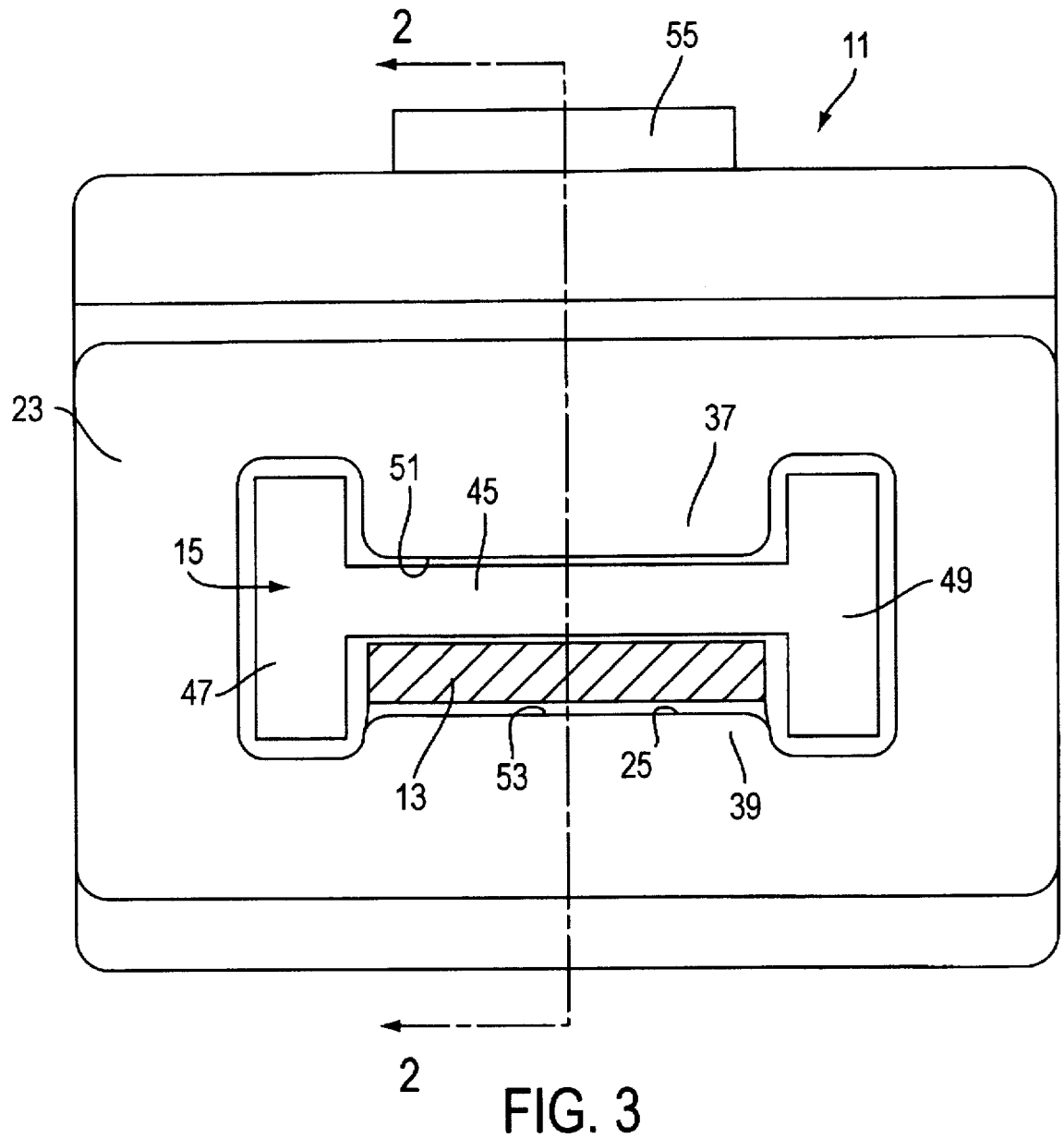
FIG. 3 is a partially cross-sectional front elevational view taken along line 3—3 of FIG. 2.
Figure 4:
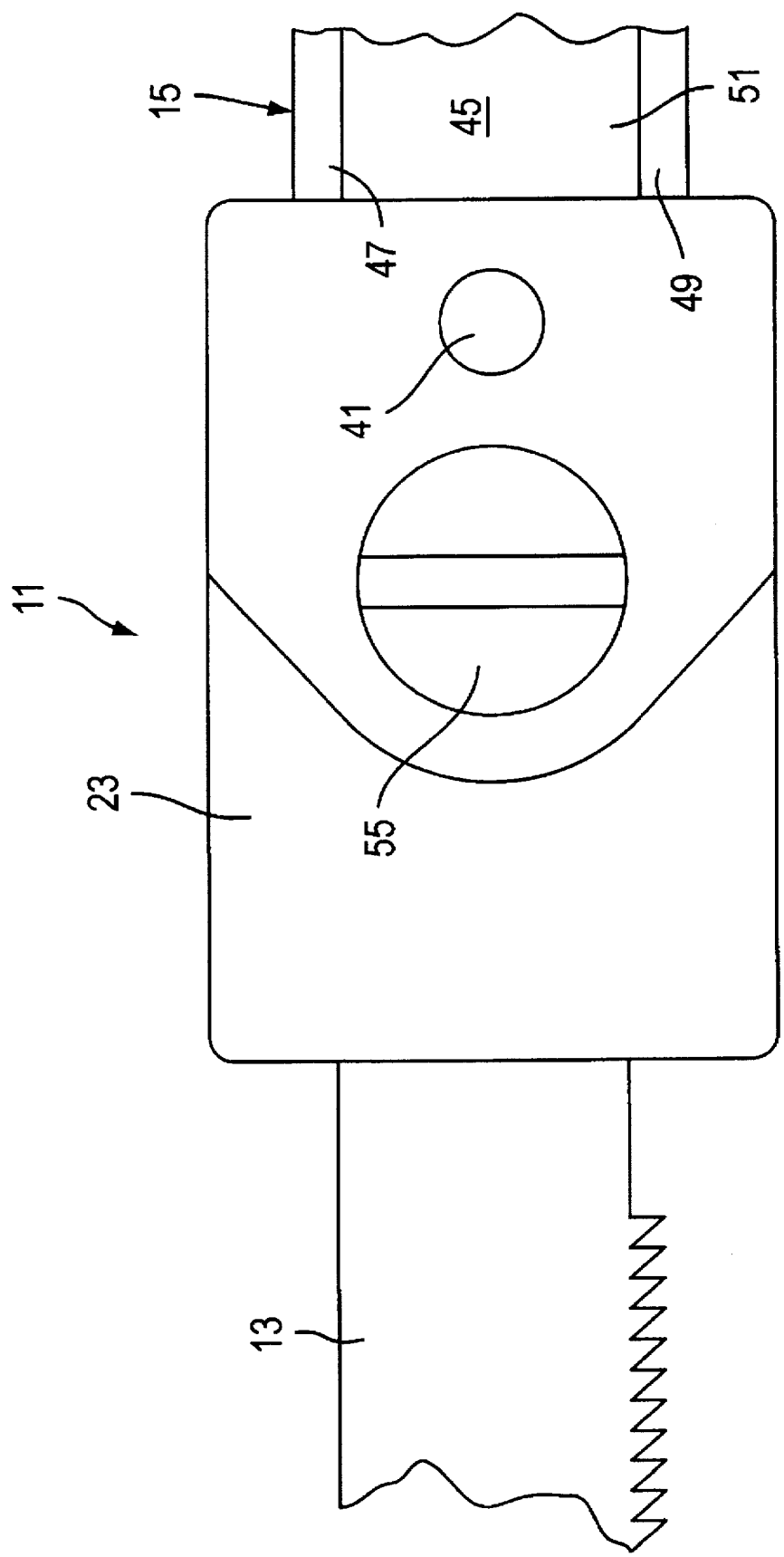
FIG. 4 is a top plan view taken along line 4—4 of FIG. 2.

As shown in FIGS. 2-4 and according to a preferred embodiment of the present invention, saw blade clamp 11 is for clamping a layered assembly 21 of saw blade 13 and drive shaft 15. Clamp 11 comprises a sleeve or body 23 preferably having a front opening 25 for receiving a shank 27 of the saw blade 13 and a rear opening 29 for receiving the drive shaft 15. A cavity 31 preferably axially extends between the front and rear openings 25, 29. Cavity 31 is bounded on the top and bottom by opposed sidewalls 33, 35, respectively.

According to the present invention, clamp 11 further comprises first and second projections 37, 39 which engage directly or indirectly opposed first and second sides of blade 13. First projection 37 is located adjacent the front opening 25 and extends into the cavity 31 from the top sidewall 33. Second projection 39 extends from the bottom sidewall 35 at a location inwardly of the front opening 25 and the first projection 37. While it is preferable that clamp 11 engages and clamps the assembly 21 of the blade 13 and shaft 15. It is sufficient that projections 37, 39 engage and rigidly clamp opposed sides of blade 13. In such a configuration the degree of overlap of shaft 15 and blade 13 would be more limited than shown in the embodiment of FIGS. 2-4. Also there is no preferred top or bottom orientation of assembly 21 in sleeve 23, i.e., blade 13 or shaft 15 may be located uppermost in assembly 21 as depicted in FIGS. 2-4.

Drive shaft 15 is fixed to the sleeve 23 and axially extends through the rear opening 29 and along the cavity 31. Preferably to fix shaft 15 to sleeve 23, a pin 41 is rigidly attached at one end to shaft 15 and is slidably attached at the other end to sleeve 23 through an opening 43. Shaft 15 preferably has an "I beam" configuration with an axially extending central web 45 and a pair of cross bars 47, 49 extending axially of the web 45. Web 45 and cross bars 47, 49 define a first channel 51 on a first side of web 45 for receiving the first projection 37 and a second channel 53 on a second opposite side of the web for receiving the shank 27 of the blade 13. Preferably, pin 41 also serves as a stop for blade 13 when inserting blade 13 into sleeve 23 through front opening 25.

According to the present invention, clamp 11 further comprises a bias member 55 adjustably attached to the top sidewall 33 of sleeve 23 at a location inwardly of the first and second projections 37, 39 and engaged with the one side of assembly 21. Bias member 55 transversely biases sleeve 23, relative to the output shaft 15, at a location inwardly of the second projection 39 and clamps the blade shank 27 tightly between first and second projections 37, 39.

A significant feature of clamp 11 is that bias member 55 causes sleeve 23 to pivot about the first projection 37 and tightly engages assembly 21 between the first and second projections 37, 39. Assembly 21 is tightly engaged because of the mechanical advantage provided by the clamping action of sleeve 23 and bias member 55. Sleeve 23 forms a moment arm with first projection 37 serving as a fulcrum for the moment arm. Thus a tight clamping action can be achieved with the application of less force applied to bias member 55 and in turn to the assembly 21 compared to conventional clamps.

Bias member 55 is preferably a fastener such as a screw threaded in and extending through an opening 57 in sleeve 23 to engage the first side of the web 45. Screw 55 requires a screwdriver for adjustment and thus clamp 11 in this embodiment would be a form of "keyed" clamp. However as will be recognized, other forms of bias members may be used that do not require a key such as a screw with a winged top. In addition, bias member 55 can be a configured as any member for applying a bias between assembly 21 and sleeve 23 so as to form a keyless clamp. For example, member 55 can be configured as a spring (not shown) that is fixed at one end to sleeve 23 and is engaged and disengaged with assembly 21 with a keyless actuator (not shown) attached to the housing of the saw.

To clamp blade 13 in clamp 11, blade 13 is inserted through front opening 25 axially along shaft 15 between shall crossbars 47, 49 until the distal blade end 59 engages pin 41. Then bias member 55 is turned inwardly to engage web 45 of shaft 15 causing sleeve 23 to pivot counterclockwise (FIG. 2) relative to shaft 15 about projection 37. The movement of sleeve 23 relative to shaft 15 also causes projection 39 to move into tight engagement with blade 13. Because of the length of the moment arm between bias member 55 and projection 37, a low torque applied to member 55 to advance member 55 into engagement with shall 15 applies a high clamping force to blade 13 with projection 39. As a result, a high clamping force may be applied to rigidly maintain blade 13 clamped to shall 15 without having to apply a high torque to tighten bias member 55.

It will be apparent to those skilled in the art that various modifications and variations can be made in the saw and the clamp of the present invention without departing from the scope or spirit of the invention. Thus, it is intended that the present invention cover these modifications and variations provided they come within scope of the appended claims and their equivalents.

I claim:

1. A saw blade clamp comprising:

a sleeve having (a) a front opening, (b) a rear opening, (c) a cavity axially extending between the front and rear openings, and (d) top and bottom opposed sidewalls;

an axially extending drive shaft fixed to the sleeve and extending through the rear opening and axially along the cavity;

the drive shaft having an axially extending central web and a pair of spaced cross bars extending axially along opposite sides of the web;

a first projection located within the cavity adjacent the front opening, extending into the cavity from the top sidewall toward the bottom sidewall and engaging the drive shaft;

a second projection located within the cavity for engaging a shank of a blade, with the shank of the blade extending through the front opening of the sleeve;

the second projection extending from the bottom sidewall of the sleeve toward the top sidewall of the sleeve at a location between the first projection and the rear opening of the sleeve; and a bias member engagable with either the blade shank or the drive shaft for pivoting the sleeve about the first projection and tightly clamping the blade shank and the drive shaft between the first and second projections.

2. A saw blade clamp for a layered assembly formed by a saw blade and a drive shaft of a saw comprising:

a sleeve having (a) a front opening for receiving a shank of the saw blade, (b) a rear opening for receiving the drive shaft, (c) a cavity axially extending between the front and rear openings, and (d) top and bottom opposed sidewalls;

the drive shaft fixed to the sleeve and axially extending through the rear opening and along the cavity;

a first projection located within the cavity adjacent the front opening, extending into the cavity from the top sidewall toward the bottom sidewall and engaging the assembly;

a second projection located within the cavity for engaging the assembly;

the second projection extending from the bottom sidewall toward the top sidewall at a location between the first projection and the rear opening;

a bias member adjustably attached to the sleeve for engagement with the assembly; and the member engagable with the assembly for pivoting the sleeve about the first projection and tightly clamping the assembly between the first and second projections.

3. The clamp of claim 2 wherein:

the bias member is engagable with the drive shaft;

the drive shaft has an axially extending central web and a pair of cross bars extending axially along opposite edges of the web; and the web and cross bars define a first channel between the cross bars on a first side of the web for receiving the first projection and a second channel between the cross bars on a second side opposite side of the web for receiving the shank of the blade.

4. The clamp of claim 3, wherein the bias member is a screw engaging the first side of the web.

5. A reciprocating saw comprising:

a motor;

a gear train connected to the motor;

a drive shaft connected to and driven by the gear train;

a saw blade clamp for clamping a layered assembly of a saw blade and the drive shaft of a saw comprising:

a sleeve having (a) a front opening for receiving a shank of the saw blade, (b) a rear opening for receiving the drive shaft, (c) a cavity axially extending between the front and rear openings, and (d) top and bottom opposed sidewalls;

the drive shaft fixed to the sleeve and axially extending through the rear opening and along the cavity;

a first projection located adjacent the front opening, extending into the cavity from the top sidewall and engaging one side of the assembly;

a second projection for engaging a second side of the assembly;

the second projection extending from the bottom sidewall at a location between the first projection and the rear opening; and a bias member (a) adjustably attached to the sleeve and (b) engaged with one side of the assembly.

6. The saw of claim 5 wherein:

the bias member is engaged with the drive shaft;

the drive shaft has an axially extending central web and a pair of cross bars extending axially of the web; and the web and the cross bars define a first channel between the cross bars on a first side of the web for receiving the first projection and a second channel between the cross bars on a second opposite side of the web for receiving the shank of the blade.

7. The saw of claim 6 wherein the bias member is a screw engaging the first side of the web.

8. A saw blade clamp for a layered assembly of a blade and a drive shaft of a saw comprising:

a body having (a) a front opening for receiving a shank of the saw blade, (b) a rear opening for receiving the drive shaft, (c) a cavity axially extending between the front and rear openings, and (d) top and bottom opposed sidewalls;

the drive shaft fixed to the sleeve and axially extending through the rear opening and along the cavity;

a first projection located adjacent the front opening, extending into the cavity from the top sidewall and engaging one side of the assembly;

a second projection for engaging a second side of the assembly;

the second projection extending from the bottom sidewall at a location the first projection and the rear opening; and a bias member for forming a moment arm between the first projection and a location within the cavity between the second projection and the rear opening and causing the assembly to be gripped between the first and second projections.

9. The blade clamp of claim 8 wherein the bias member is engaged with the drive shaft at a location between the second projection and the rear opening.

10. A saw blade clamp for clamping a saw blade to a saw drive shaft comprising:

a body fixed to the drive shaft and having front and second ends, a first sidewall extending between the front and rear ends, and a second sidewall opposed to the first sidewall and extending between the front and rear ends;

the blade locatable between the first and second sidewalls and extending from the front end toward the rear end of the body when the blade is assembled within the clamp;

the drive shaft locatable between the first and second sidewalls and extending from the rear end toward the front end of the body when the drive shaft is assembled within the clamp;

a first projection on the first sidewall adjacent to the first end;

a second projection on the second sidewall between the first projection and the rear end; and a bias member transversely biasing the body, relative to the drive shaft, at a location between the second projection and the rear end and clamping the blade shank between the first and second projections.

11. The blade clamp of claim 1 wherein the bias member is engaged with the drive shaft to apply a bias to the body.

* * * * *